April 24, 1951     J. M. CARLIN     2,550,222
HUB CAP
Filed April 1, 1946     2 Sheets-Sheet 1
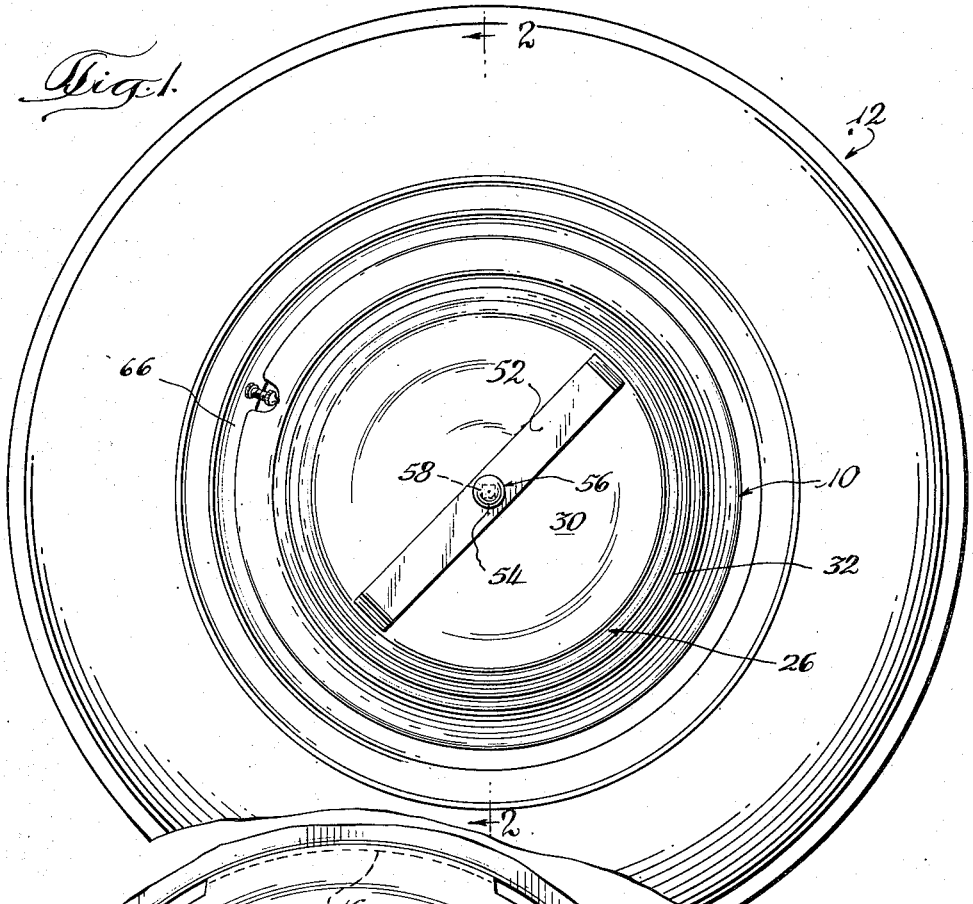
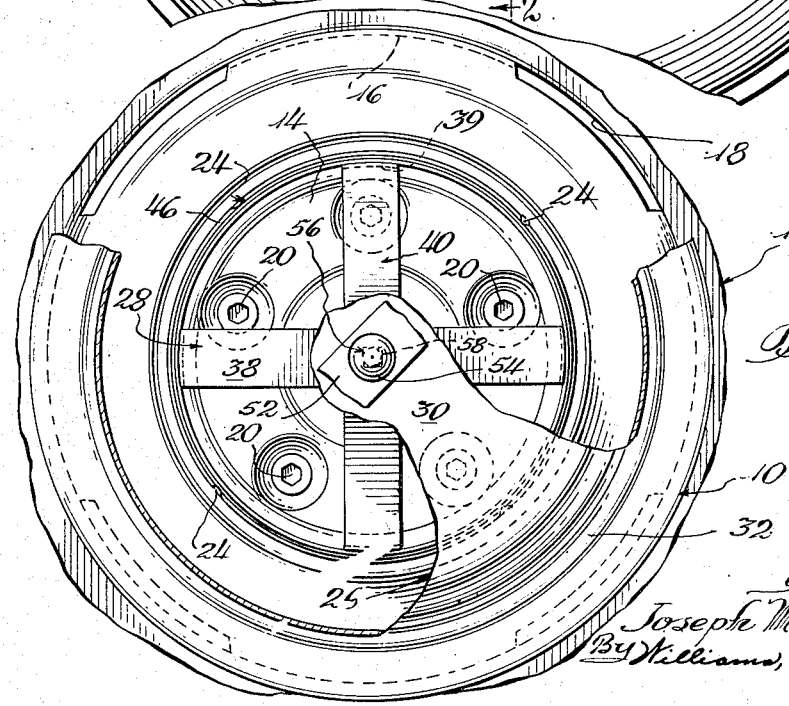
Inventor:
Joseph M. Carlin
By Williams, Bradbury & Hinkle
Attorneys April 24, 1951     J. M. CARLIN     2,550,222
HUB CAP
Filed April 1, 1946     2 Sheets-Sheet 2
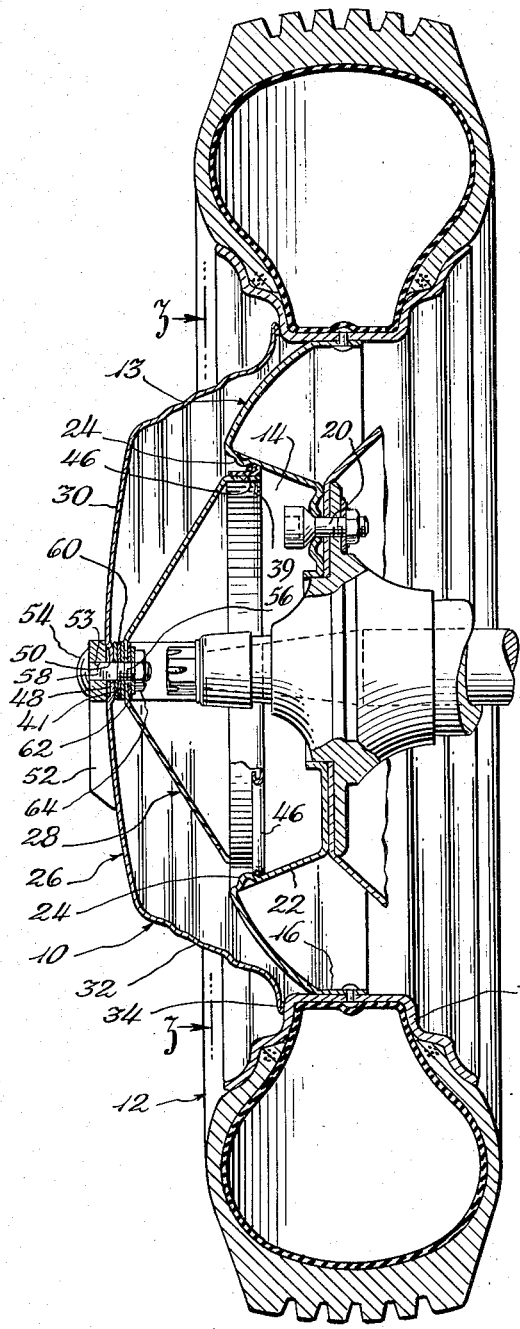
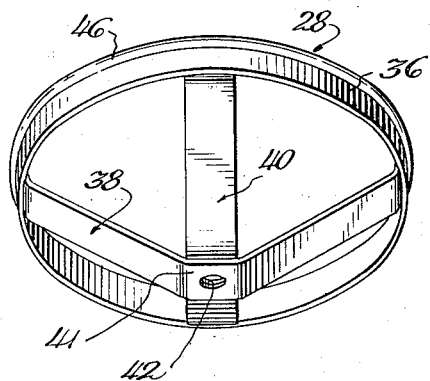
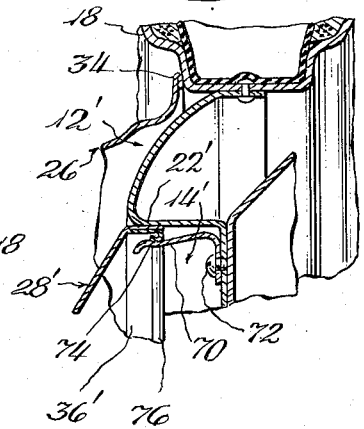
Inventor:
Joseph M. Carlin
By Williams, Bradbury & Hinkle
Attorneys Patented Apr. 24, 1951

2,550,222

UNITED STATES PATENT OFFICE 2,550,222

HUB CAP

Joseph M. Carlin, Jacksonville, Fla.

Application April 1, 1946, Serial No. 658,831

5 Claims. (Cl. 301—37)

My invention relates to automobile hub caps and particularly to a large size or "jumbo" hub cap which may be mounted on any standard size conventional automobile wheel.

All of the automobile manufacturers do not provide their various automobiles with a wheel of the same design, although most of the automobiles now manufactured are equipped with 16" wheels. These wheels are of different and individual design and are fitted with many different sizes of hub caps, each of which is formed with a special attaching means to hold it against the face of the wheel. Many owners desire to "dress-up" their automobiles by replacing the standard, usually plain and small, hub cap with a large, chromium plated hub cap which is sometimes called a "jumbo" hub cap. These hub caps are usually large enough to cover the entire wheel and, therefore, have a diameter which is only slightly less than the diameter of the wheel.

The "jumbo" hub caps are not standard equipment on an automobile, and they are generally not manufactured by the automobile manufacturer. People desiring to fit their automobiles with these hub caps must buy a hub cap made specially for the particular make and model of car which he owns. As there are many auto manufacturers and as each brings out a new model every year, these hub caps are necessarily expensive because they cannot be produced in sufficiently large quantities to enable them to be manufactured at low costs.

My invention is concerned with a novel "jumbo" hub cap and the principal object is to provide such a hub cap which can be used interchangeably on any standard size conventional automobile wheel, regardless of the manufacturer or model.

A further object is to provide a novel means for mounting a hub cap on an automobile wheel.

Another object is to provide novel means for mounting the same hub cap on various wheels of different design.

Another object is to provide a novel attaching means for mounting a hub cap to an automobile wheel, which means is separable from the hub cap and may be changed so that the same hub cap may be mounted on a wheel of a different design.

A still further object is to provide an improved "jumbo" hub cap which is simple and rugged in construction and which is easy and inexpensive to manufacture.

And a still further object is to provide an improved "jumbo" hub cap which is mounted on and removed from an automobile wheel in the same manner as a standard hub cap.

Other objects and advantages will become apparent from the following description taken in conjunction with the accompanying drawings in which:

Fig. 1 is an elevational view of a standard automobile wheel having my novel "jumbo" hub cap mounted thereon;

Fig. 2 is a cross-sectional view of the wheel and hub cap and may be considered as being taken substantially on the line 2—2 of Fig. 1, looking in the direction of the arrows;

Fig. 3 is an enlarged plan section taken substantially on the line 3—3 of Fig. 2, looking in the direction of the arrows;

Fig. 4 is a perspective view of the adapter; and

Fig. 5 is a fragmentary cross sectional view of a different wheel showing a slightly different form of the invention.

While the embodiments illustrated are dimensioned for 16" wheels which are the most popular, there is no intention on my part to limit this invention to one with 16" wheels. Therefore, when I refer to standard or conventional automobile wheels in the specification and claims, I refer to a wheel which is standard equipment on any make of automobile.

My novel "jumbo" hub cap, indicated generally by the reference character 10, is shown mounted upon an automobile wheel 12, which comprises a central body portion 13 having a central recess 14 and a plurality of circumferential flanges 16 to which a tire carrying rim 18 is riveted. The wheel 12 is shown mounted on an automobile axle in the conventional manner by studs 20. The recess 14 has a conically shaped wall 22 in which is formed a plurality of small projections 24 which are adapted to be engaged by the attaching means formed on a standard automobile hub.

As clearly seen in Figs. 1 and 2, the hub cap 10 comprises a dome-like member or shell 26 which is secured to a device 28 for mounting the hub cap on the wheel of the automobile. The shell 26 has a central portion 30 which has a diameter somewhat greater than half the diameter of the wheel and is formed as a small portion of a sphere of very large diameter. The central portion 30 is surrounded by an integrally formed skirt portion 32 which is ribbed to give a pleasing design to the contour of the hub cap and which flares outwardly and inwardly toward the rim of the wheel. At its outer edge the skirt portion 32 is rolled back upon itself to form a bead 34 adding a considerable amount of strength to the edge of the hub cap to resist bending when the tools are applied thereto to remove the hub cap from the wheel. This bead is positioned to contact the tire retaining rim 18, and the entire wheel is effectively and artistically covered by the hub cap.

The hub cap is held against the rim of the wheel by the retaining device 28 which I prefer to call an adapter. The adapter 28, shown in perspective in Fig. 4, has a cage-like appearance and includes a circular strip of metal 36 having an outer surface which is an exact circle and a pair of straps 38 and 40. Each of the straps 38 and 40 is in the form of a wide V with a flat apex 41 and having its outer ends 39 likewise substantially flat but in a plane which is perpendicular to the plane in which the flat apex lies. The straps 38 and 40 are arranged at right angles to each other and have the flat ends 39 welded to strip 36; when the straps 38 and 40 cross at the central axis of the circle formed by the strip 36, their flat apices 41 are spot welded or otherwise suitably secured together. After the straps 38 and 40 have been secured to the strip 36, a hole 42 is bored at the central axis of the adapter in the flat apices 41, the hole 42 being used to pass a bolt 56 which will hold the adapter to the shell 26.

The circular strip 36 is provided with a bead 46 around its outer edge on the side opposite that on which the straps 38 and 40 form a cage. This bead is adapted to engage behind the projections 24 on the wall 22 of the conical recess 14, thereby firmly holding the adapter in a position coaxial with the wheel.

The shell 26, which may be formed in a metal drawing operation, is provided at its center with a circular depression 48 and, in the center thereof, there is punched a square opening 50. Across the outer face of the central portion 30 there may be placed a spinner bar 52 to enhance the beauty of this hub cap. If the spinner bar is omitted from the assembly, head 54 of a bolt 56 engages in the circular recess 48. The bolt 56 is provided with a shank having a square portion 58 adjacent the head 54. The square portion 58 engages in the square opening 50 in the shell 26 to prevent that member from moving in a rotational direction relative to the adapter 28 or the wheel 12 and if the spinner bar 52 is included, it engages in a square opening 53 therein for the same purpose; suitable spacer washers 60 are placed adjacent the inner face of the central portion 30 and between the shell 26 and the adapter 28. The number of these spacer washers is varied depending on the installation to give the proper spacing between the plane in which the bead 46 on the adapter 28 lies and the plane in which the bead 34 on the shell 26 lies so that, when mounted on the wheel, the bead 34 would engage the tire retaining rim 18 and not be loose to rattle. The adapter 28 is held against loosening by a lock washer 62 and nut 64 threaded onto the bolt 56, which completes the means for bolting the adapter 28 to the shell 26.

A semi-circular opening 66 is provided in the outer periphery of the shell 26 to permit the valve stem 68 to protrude and be readily accessible for filling the automobile tire.

In Fig. 5 there is illustrated a modification of the invention which is adapted to be used with a slightly different design of automobile wheel. The wheel 12' is constructed in a manner very similar to that shown in Fig. 2, except that the recess 14' is provided with a plurality of spring fingers or clips 70 which are secured to the wheel by suitable means such as machine screws 72. Each spring finger 70 is provided at its outer tip with a relatively shallow S-curve portion 74 which is adapted to engage the lip of a standard hub cap and hold it against the wall 22' of the recess 14", the wall 22' having a smooth surface with no projections similar to the projection 24 previously described.

The adapter 28' is similar to that illustrated in Fig. 4 but has one difference in that a bead 76 is rolled on the inside of the face of a strip 36' rather than on the outside. This bead 76 is adapted to engage the curved portion 74 of the spring finger 70 and thereby retain the shell 26 with its peripheral bead 34 against the wheel rim 18'. The shape of the shell 26 may be identical in every respect with that previously described, and the adapter 28' is secured thereto in exactly the same manner as heretofore set out.

I prefer to shape the shell 26 generally as shown in Fig. 2 with a rather wide gently curved portion 30 for two reasons—the first reason is concerned with the artistic appearance of the hub cap and the second with its mechanical aspect. With a hub cap so shaped, any range of wheel designs of the same size may be fitted because there is sufficient room within the shell 26 to accommodate adapters 28 of varying size—both in the range of the diameter of the circular strip 36 and in the overall depth of the adapter, which is measured from the plane of the bead 46 to the flat apices 41 of the crossed straps 38 and 40.

When a purchaser desires to fit his automobile with my novel hub cap, the supplier selects the adapter which is dimensioned to fit the particular automobile the purchaser owns and mounts that on the shell 26 by means of the bolt 56, washers 60 and 62, and nut 64. Thus the same design of hub cap can be used for any number of automobiles having the same size wheel as all the supplier has to know is the manufacture and model of the automobile to be fitted with this "jumbo" hub cap so that he might select the proper adapter.

Many attractive designs of the shell 26 may be used and the spinner bar 52 may be added or not, according to the desires of the purchaser.

As the shell 26 is usually chromium plated—or provided with some other comparable and beautiful finish—it is relatively expensive to manufacture when compared with the adapter 28. Since I am able to use the same shell for each wheel of the same size regardless of the make or model of automobile, I am able materially to reduce the cost of manufacture because large quantity production methods can be utilized. This is not true of other "jumbo" hub caps which are frequently merely large size variations of a standard hub cap, and, therefore, these other hub caps are more expensive than my improved hub cap.

While I have shown the preferred form of my invention, it will be appreciated that many changes may be made therein without departing from the spirit and scope of my invention and, therefore, I desire to be limited only by the scope of the appended claims.

What I claim as new and desire to secure by United tates Letters Patent is:

1. A hub cap adapted to be mounted on an automobile wheel of the type having retaining members engageable by a hub cap to secure the latter against the face of the wheel, comprising in combination a dome-like shell having a diameter substantially equal to that of the wheel, and an adapter secured to said shell at its center, said adapter comprising a circular strip coaxial with said shell, a pair of straps having their ends connected to said circular strip and crossing each other at the center of the circle, and means on said circular strip arranged to engage the hub cap retaining members so as to hold said shell in place.

2. A hub cap adapted to be mounted on an automobile wheel of the type having retaining members engageable by a hub cap to secure the latter against the face of the wheel, comprising in combination a dome-like shell having a diameter substantially equal to that of the wheel, an adapter, said adapter comprising a circular strip coaxial with said shell, a pair of straps having their end secured to said circular strip and crossing each other in the center of the circle, and means on said circulr strip arranged to engage the hub cap retaining member, and means including a bolt extending inwardly of said shell removably securing said adapter at the point where said straps cross to said shell at its axial center.

3. A hub cap adapted to be mounted on an automobile wheel of the type having retaining members engageable by a hub cap to secure the latter against the face of the wheel, comprising in combination a dome-like shell having a diameter substantially equal to that of the wheel, an adapter having a cage-like appearance including a circular strip arranged coaxial with said shell, a pair of crossed straps having their ends secured to said strip, said straps being positioned at right angles to each other and being secured together at their point of crossing which is at the axial center of said shell, and a bead on said circular strip arranged to engage the hub cap retaining members, and means removably securing said adapter to said shell at its axial center.

4. A hub cap adapted to be mounted on an automobile wheel of the type having retaining members engageable by a hub cap to secure the latter against the face of the wheel, comprising in combination a dome-like substantially rigid shell having a diameter substantially equal to that of the wheel, an adapter having a cage-like form including a circular strip arranged coaxially with said shell, a pair of crossed straps having their ends secured to said circular strip, said straps being positioned at right angles to each other and being secured together at their point of crossing which is at the axial center of said shell, an opening in said straps in said crossing, and a bead formed on said circular strip arranged to engage the hub cap retaining members, a bolt passing inwardly through said shell and said opening removably securing said shell to said adapter, and means positioned within said shell and associated with said bolt axially to adjust the relative position of said shell and said adapter so that the outer edge of said shell lies against the wheel rim.

5. A hub cap adapted to be mounted on an automobile wheel comprsiing in combination a cage-like adapter including a substantially circular strip, a pair of straps having their extremities secured to said circular strip, said straps being placed at right angles to each other and having their point of crossing in a plane spaced axially away from said circular strip, said straps being flat at their point of crossing and being secured together at that point, and a circumferential bead formed on said circular strip; a dome-like shell enclosing said adapter, said shell forming the artistic element of the hub cap and being of a configuration substantially to cover the wheel; and means removably securing said adapter to said shell.

JOSEPH M. CARLIN.

REFERENCES CITED

The following references are of record in the file of this patent:

UNITED STATES PATENTS

| Number | Name | Date |
| --- | --- | --- |
| 1,657,374 | Dietzel | Jan. 24, 1928 |
| 2,264,000 | McKechnie | Nov. 25, 1941 |
| 2,329,945 | Schatzman | Sept. 21, 1943 |
| 2,386,243 | Lyon | Oct. 9, 1945 |

FOREIGN PATENTS

| Number | Country | Date |
| --- | --- | --- |
| 289,650 | Germany | Jan. 12, 1916 |
| 320,285 | Great Britain | Oct. 10, 1929 |
| 279,319 | Italy | Nov. 8, 1930 |